US009354818B2

(12) United States Patent
Kuo et al.

(10) Patent No.: US 9,354,818 B2
(45) Date of Patent: May 31, 2016

(54) MEMORY DEVICE AND DATA STORING METHOD

(71) Applicant: Kabushiki Kaisha Toshiba, Minato-ku (JP)

(72) Inventors: Yaotung Kuo, Shinagawa (JP); Koichi Nagai, Ota (JP); Shoji Sawamura, Yokohama (JP); Nobuhiro Kondo, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/475,907

(22) Filed: Sep. 3, 2014

(65) Prior Publication Data

US 2015/0242141 A1    Aug. 27, 2015

Related U.S. Application Data

(60) Provisional application No. 61/944,405, filed on Feb. 25, 2014.

(51) Int. Cl.
  *G06F 21/00* (2013.01)
  *G06F 3/06* (2006.01)
  *G06F 11/00* (2006.01)

(52) U.S. Cl.
  CPC ............. *G06F 3/0619* (2013.01); *G06F 3/065* (2013.01); *G06F 3/0625* (2013.01); *G06F 3/0679* (2013.01); *G06F 11/00* (2013.01); *G06F 2206/1014* (2013.01)

(58) Field of Classification Search
  CPC . H04L 63/0227; H04L 63/0428; H04L 63/02; G06F 3/0625
  See application file for complete search history.

(56) References Cited

U.S. PATENT DOCUMENTS

| 5,345,347 | A  | * | 9/1994  | Hopkins   | G06F 1/3215 360/71   |
|-----------|----|---|---------|-----------|----------------------|
| 6,539,338 | B1 | * | 3/2003  | Pickreign | G06F 11/27 455/115.1 |
| 7,496,695 | B2 |   | 2/2009  | Go et al. |                      |
| 7,626,940 | B2 | * | 12/2009 | Jain      | H04L 63/1441 370/252 |
| 7,680,963 | B2 |   | 3/2010  | Go et al. |                      |
| 8,032,670 | B2 |   | 10/2011 | Go et al. |                      |
| 8,041,990 | B2 |   | 10/2011 | O'Connor et al. |                |
| 8,196,009 | B2 |   | 6/2012  | Bains et al. |                   |
| 8,209,446 | B2 |   | 6/2012  | Go et al. |                      |
| 8,281,218 | B1 | * | 10/2012 | Ybarra    | G06F 11/1004 714/763 |
| 8,417,844 | B2 |   | 4/2013  | Go et al. |                      |
| 8,566,485 | B2 |   | 10/2013 | Go et al. |                      |
| 2003/0140299 | A1 | * | 7/2003  | Duncan | G11B 20/1833 714/763 |
| 2005/0281288 | A1 | * | 12/2005 | Banerjee | H04L 47/10 370/477 |
| 2006/0018315 | A1 | * | 1/2006  | Baratakke | H04L 69/16 370/389 |
| 2007/0283041 | A1 | * | 12/2007 | Chung | H04L 12/66 709/238 |

(Continued)

FOREIGN PATENT DOCUMENTS

JP   4815491   11/2011
JP   4863472   1/2012

(Continued)

*Primary Examiner* — Izunna Okeke
*Assistant Examiner* — Ali Shayanfar
(74) *Attorney, Agent, or Firm* — Oblon, McClelland, Maier & Neustadt, L.L.P.

(57) ABSTRACT

According to one embodiment, a data storing method includes saving data stored in a memory device to a host device and verifying validity or accuracy of the data saved in the host device.

16 Claims, 7 Drawing Sheets

(56) References Cited

U.S. PATENT DOCUMENTS

| | | | |
|---|---|---|---|
| 2008/0183901 A1* | 7/2008 | Cardona | H04L 69/16 709/250 |
| 2009/0049222 A1* | 2/2009 | Lee | G06F 13/1684 710/300 |
| 2010/0106886 A1* | 4/2010 | Marcu | G06F 1/3225 711/102 |
| 2011/0161551 A1* | 6/2011 | Khosravi | G06F 9/5077 711/103 |
| 2012/0081718 A1* | 4/2012 | Soriano | G06F 3/1208 358/1.9 |
| 2012/0198514 A1 | 8/2012 | McCune et al. | |
| 2012/0260349 A1* | 10/2012 | Nagai | G06F 21/44 726/28 |
| 2013/0268753 A1* | 10/2013 | Vanderpol | H04L 63/123 713/155 |
| 2014/0281626 A1* | 9/2014 | Younger | G06F 1/3206 713/323 |
| 2015/0074330 A1* | 3/2015 | Sawamura | G06F 12/0246 711/103 |

FOREIGN PATENT DOCUMENTS

| | | |
|---|---|---|
| JP | 2013-501300 | 1/2013 |
| JP | 2013-65347 | 4/2013 |
| JP | 5349470 | 11/2013 |

* cited by examiner

MEMORY DEVICE AND DATA STORING METHOD

CROSS-REFERENCE TO RELATED APPLICATIONS

This application is based upon and claims the benefit of priority from Provisional Patent Application No. 61/944,405, filed on Feb. 25, 2014; the entire contents of which are incorporated herein by reference.

FIELD

Embodiments described herein relate generally to a memory device and a data storing method.

BACKGROUND

In a memory device including a non-volatile memory, data read from the non-volatile memory into the RAM is saved to the non-volatile memory to prevent loss of the data at power-off. Then, at power-on of the memory device, the data saved in the non-volatile memory is read again from the non-volatile memory into the RAM.

DETAILED DESCRIPTION

In general, according to one embodiment, a data storing method includes saving data stored in a memory device to a host device and verifying validity or accuracy of the data saved in the host device.

Exemplary embodiments of a memory device and a data storing method will be explained below in detail with reference to the accompanying drawings. The present invention is not limited to the following embodiments.

First Embodiment

Figure 1:
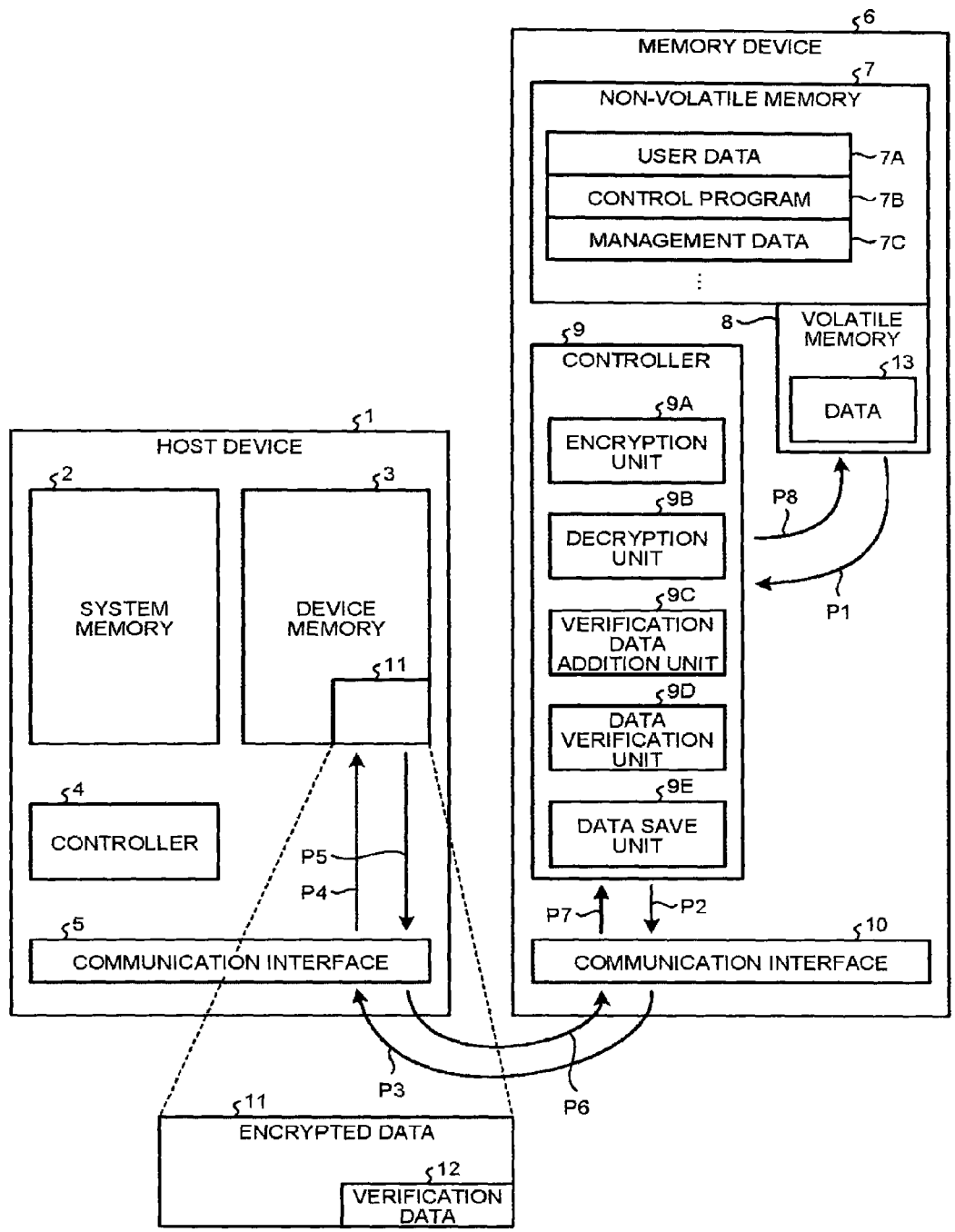
FIG. 1 is a schematic block diagram of a memory system to which a memory device according to a first embodiment is applied.

FIG. 1 is a schematic block diagram of a memory system to which a memory device according to a first embodiment is applied.

Referring to FIG. 1, the memory system includes a host device 1 and a memory device 6. The host device 1 may be a personal computer or a mobile information terminal such as a smart phone, for example. The memory device 6 may be a memory card such as an SD card, or a multimedia card such as eMMC™, or an external memory device such as an SSD (solid state drive), or a memory module in conformance with UFS (universal flash storage) standards, for example.

The host device 1 includes a system memory 2, a device memory 3, a controller 4, and a communication interface 5. The system memory 2 provides a memory area to the host device 1. The device memory 3 provides a memory area to the memory device 6. The system memory 2 and the device memory 3 may be volatile memories such as DRAM or SRAM. The controller 4 controls operations of the host device 1. The controller 4 can be realized by a processor working based on firmware. The communication interface 5 mediates data transferred between the host device 1 and the memory device 6.

The memory device 6 includes a non-volatile memory 7, a volatile memory 8, a controller 9, and a communication interface 10. The non-volatile memory 7 provides a memory area for data stored in the memory device 6. The data stored in the non-volatile memory 7 is user data 7A, control program 7B for the controller 9, management data 7C for the non-volatile memory 7, and others. An address conversion table associates a logical block address used by the host device 1 to access the memory device 6 with a physical address (block address+ page address+in-page stored position) in the non-volatile memory 7. Read/write statistical data may be the number of times when the non-volatile memory 7 was read, the number of times when the non-volatile memory 7 was written, or the like, for example. The non-volatile memory 7 may be an NAND flash memory, for example. The non-volatile memory 7 may include a ROM for storing data that does not need to be written by the memory device 6. The volatile memory 8 provides a development area for a program for operating the controller 9, a work area for the controller 9, and the like. The volatile memory 8 may be a DRAM, a RAM, or the like, for example. The controller 9 controls operations of the controller 9. The controller 9 can be realized by a processor working based on firmware. The communication interface 10 mediates data transferred between the host device 1 and the memory device 6. The communication interfaces 5 and 10 may conform to BATA or PCI Express.

The controller 9 includes an encryption unit 9A, a decryption unit 9B, a verification data addition unit 9C, a data verification unit 9D, and a data save unit 9E. The encryption unit 9A encrypts data 13 saved to the host device 1. The decryption unit 9B decrypts encrypted data 11 obtained by encrypting the data 13. The verification data addition unit 9C adds verification data 12 for use in verification by the data verification unit 9D to the data 13 saved to the host device 1. The data verification unit 9D verifies validity or accuracy of the data 13 saved in the host device 1 based on the verification data 12. Validity of the data 13 may indicate whether the data 13 is consistent between before and after being saved to the host device 1. Accuracy of the data 13 may indicate whether the data 13 is forged when being saved to the host device 1. The data save unit 9E saves the data 13 stored in the volatile memory 8 to the host device 1. The encryption unit 9A, the decryption unit 9B, the verification data addition unit 9C, the data verification unit 9D, and the data save unit 98 can be realized by executing programs describing the foregoing operations by a processor. The programs describing these operations can be stored in the non-volatile memory 7.

In addition, when the controller 9 performs a process in a normal operation mode, the controller 9 reads the data 13 necessary for operations of the controller 9 from the non-volatile memory 7 into the volatile memory 8. In addition, when the memory device 6 shifts from the normal operation mode to a low-power consumption mode, the controller 9 generates the encrypted data 11 by encrypting the data 13 on the volatile memory 8, and calculates the verification data 12 from the data 13 or the encrypted data 11 and adds the same to the encrypted data 11 (P1). The low-power consumption mode of the memory device 6 may be the powered-off state of the entire memory device 6, or the powered-off state of the partial memory device 6, or the state in which a power-supply voltage of the memory device 6 is lowered. The verification data 12 may be determined from the data 13 before the encryption or determined from the encrypted data 11. The verification data 12 may be encrypted together with the encrypted data 11.

When the verification data 12 is added to the encrypted data 11, the verification data 12 is transferred to the host device 1 via the communication interfaces 5 and 10 (P2 and P3), and then is stored in the device memory 3 (P4).

When the memory device 6 shifts from the low-power consumption mode to the normal operation mode, the encrypted data 11 with the verification data 12 is read from the device memory 3 (P5), and is transferred to the memory device 6 via the communication interfaces 5 and 10 (P5 and P6). Then, the controller 9 verifies the data 13 with the verification data 12 for validity or accuracy, and decrypts the encrypted data 11 (P7), and then returns the data 13 to the volatile memory 8 (P8). When the verification data 12 is determined from the data 13 before the encryption, the data 13 can be verified for validity or accuracy by decrypting the saved data 13 from the encrypted data 11, and comparing verification data determined from the saved data 13 with the verification data added to the saved data 13. When the verification data 12 is determined from the encrypted data 11, the data 13 can be verified for validity or accuracy by comparing the verification data determined the data 13 with the verification data added to the encrypted data 11.

When the data 13 stored in the memory device 6 is saved to the host device 1, the data saved in the host device 1 can be verified for validity or accuracy to assure reliability of the data 13 used in the memory device 6 even if data is lost or forged at the host device side 1.

In addition, saving the data 13 stored in the volatile memory 8 to the host device 1 eliminates the need to write the data 13 into the non-volatile memory 7 at power-off of the memory device 6. It is thus possible to reduce the number of times when the non-volatile memory 7 is accessed, achieve longer life of the non-volatile memory 7, and reduce power consumption of the memory device 6.

Second Embodiment

Figure 2:
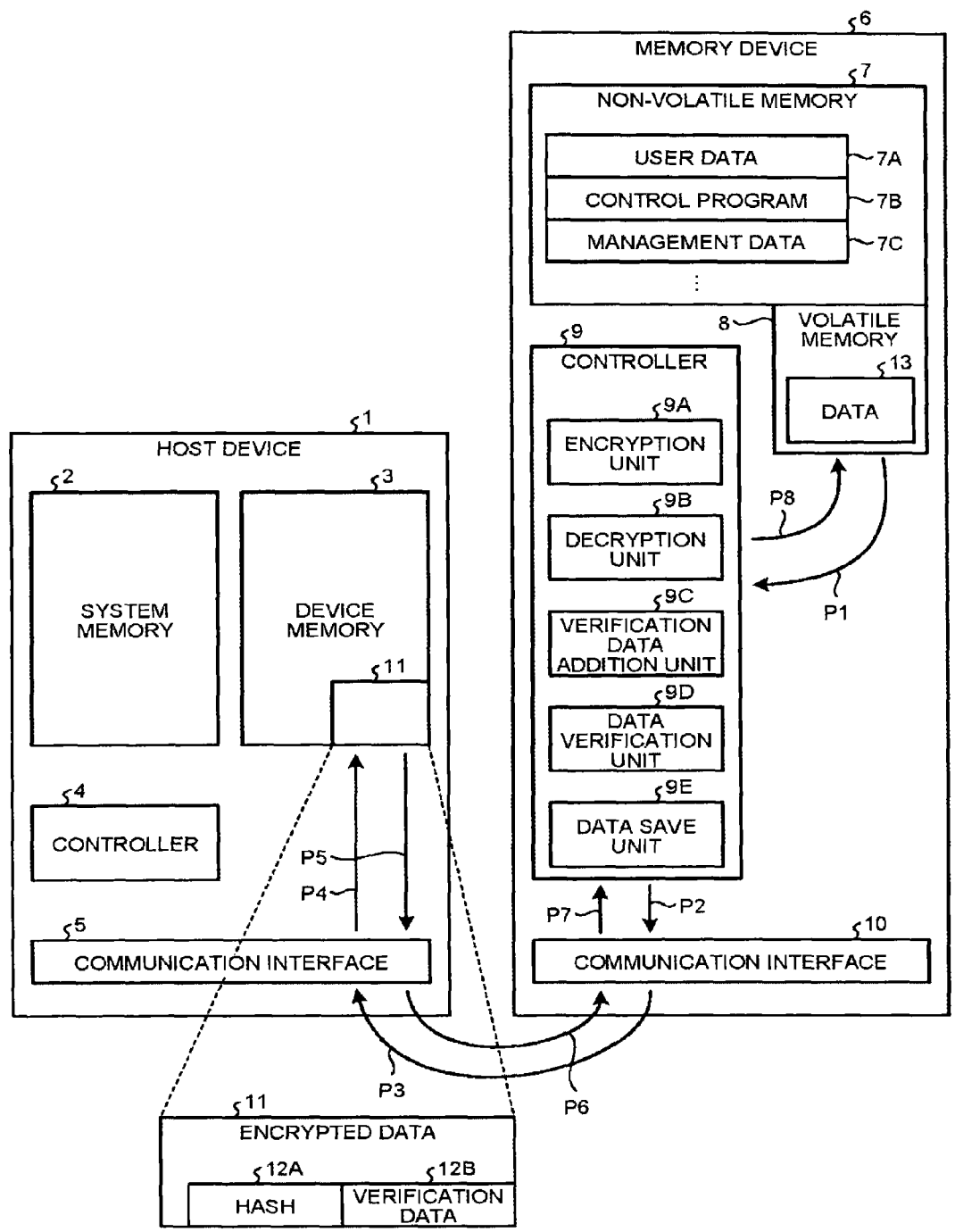
FIG. 2 is a schematic block diagram of a memory system to which a memory device according to a second embodiment is applied.

FIG. 2 is a schematic block diagram of a memory system to which a memory device according to a second embodiment is applied.

Referring to FIG. 2, in the memory system, used as verification data 12 are hash 12A and checksum 12B. A hash function can be set such that, as the data 13 is different, the hash 12A of the data 13 is also different.

By using the checksum 12B as verification data 12, it is possible to verify whether the data 13 is consistent between before and after being saved to the host device 1. Accordingly, it is possible to verify validity of the data 13 at the device memory 3 side even if the encrypted data 11 stored in the device memory 3 is lost due to power-off of the host device 1.

By using the hash 12A as verification data 12, it is possible to verify whether the data 13 saved in the host device 1 is forged. Accordingly, it is possible to verify accuracy of the data 13 at the device memory 3 side even if security of the host device 1 is not assured.

Figure 3:
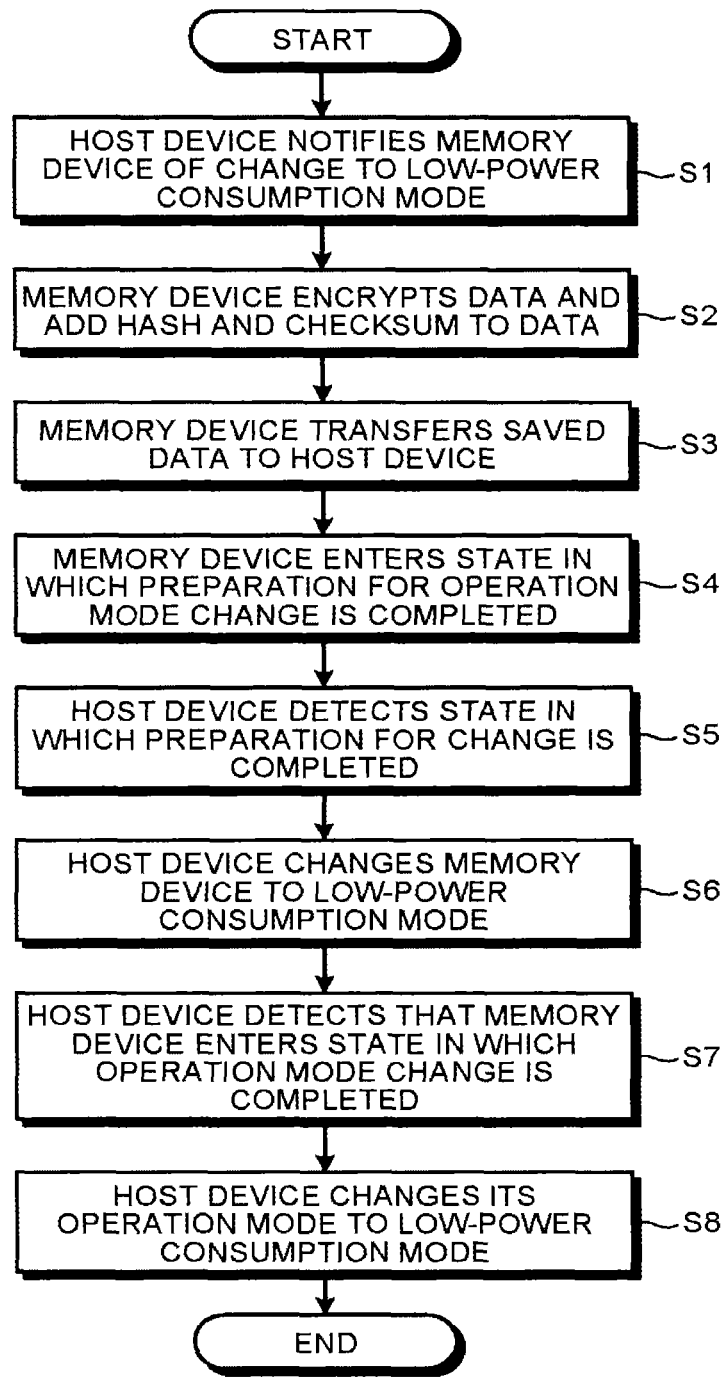
FIG. 3 is a flowchart of a method for writing data from the memory device to a host device illustrated in FIG. 2.

FIG. 3 is a flowchart of a method for writing data from the memory device to the host, device illustrated in FIG. 2.

Referring to FIG. 3, when a change takes place from the normal operation mode to the low-power consumption mode, the host device 1 notifies the memory device 6 of the change to the low-power consumption (S1).

Next, the memory device 6 encrypts the data 13 in the volatile memory 8 to generate the encrypted data 11, and calculates the hash 12A and the checksum 12B from the data 13 or the encrypted data 11, and adds the same to the encrypted data 11 (S2).

Then, the memory device 6 transfers the encrypted data 11 with the hash 12A and the checksum 12B to the host device 1 (S3). Thus, the encrypted data 11 with the hash 12A and the checksum 128 is written into the device memory 3 of the host device 1. Accordingly, the memory device 6 enters a state in which preparation for change of operation modes is completed (S4).

Next, the host device 1 checks the state of the memory device 6 to detect that the memory device 6 is in the state in which the change preparation is completed (S5). Then, the host device 1 changes the memory device 6 from the normal operation mode to the low-power consumption mode (S6).

Next, the host device 1 checks the state of the memory device 6 to detect that the memory device 6 is in the state in which the operation mode change is completed (S7). Then, the host device 1 changes its operation mode from the normal operation mode to the low-power consumption mode (S8). In the low-power consumption mode of the host device 1, it is possible to supply power so as not to lose the data stored in the device memory 3.

Figure 4:
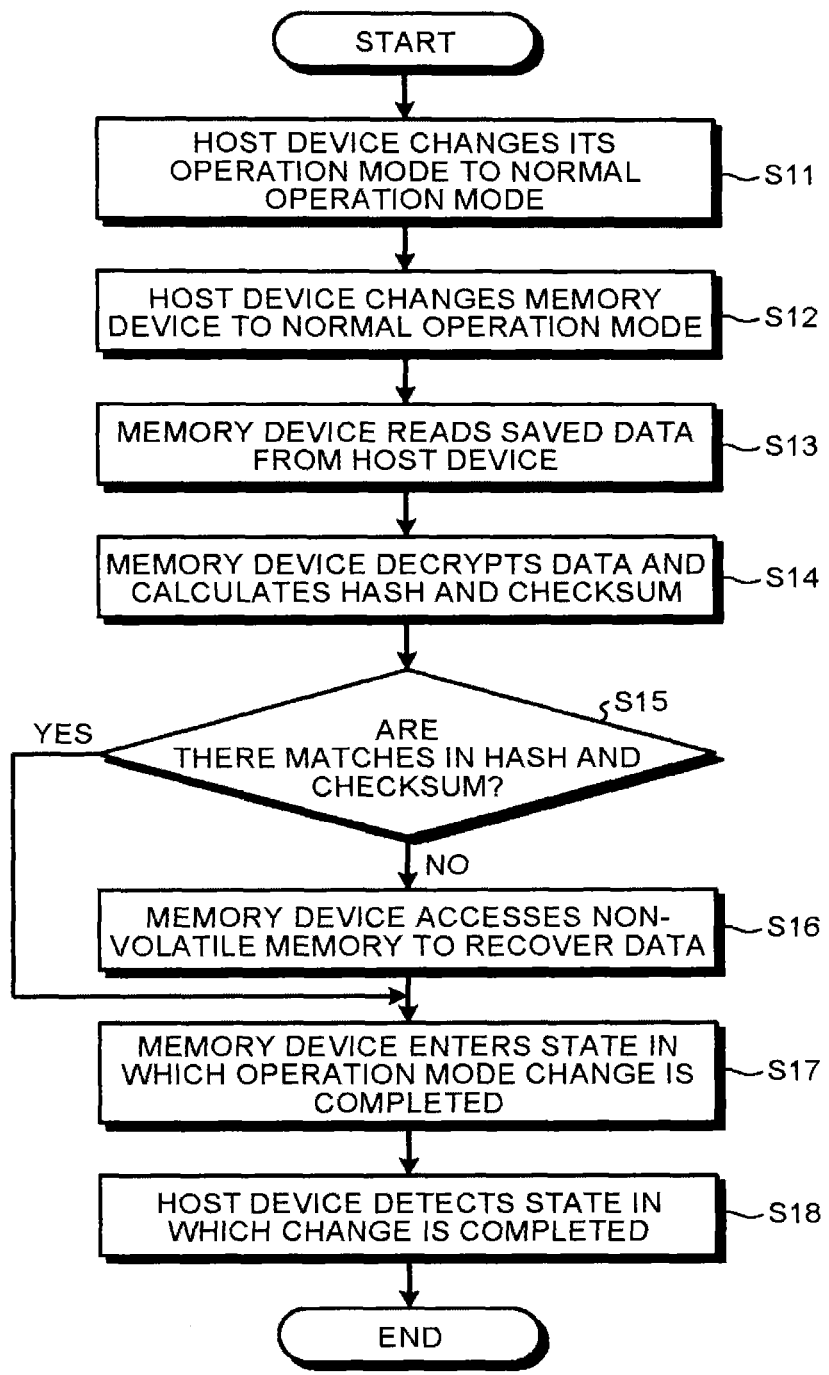
FIG. 4 is a flowchart of a method for reading data from the host device into the memory device illustrated in FIG. 2.

FIG. 4 is a flowchart of a method for reading data from the host device illustrated in FIG. 2 into the memory device.

Referring to FIG. 4, when the low-power consumption mode is changed to the normal operation mode, the host device 1 change its operation mode to the normal operation mode (S11). The host device 1 also changes the memory device 6 from the low-power consumption mode to the normal operation mode (S12).

Next, the memory device 6 reads the encrypted data 11 with the hash 12A and the checksum 12B from the device memory 3 of the host device 1 (S13). Then, the memory device 6 decrypts the encrypted data 11 and calculates the hash 12A and the checksum 12B from the encrypted data 11 or the decrypted data 13 (S14). Then, the memory device 6 compares the hash 12A and the checksum 12B calculated from the encrypted data 11 or the decrypted data 13 to the hash 12A and the checksum 12B added to the encrypted data 11, respectively (S15). When there are matches between them, the memory device 6 stores the decrypted data 13 in the volatile memory 8. Meanwhile, when there are no matches between them, the memory device 6 accesses the non-volatile memory 7, and restores the data 13 and stores the same in the volatile memory 8 (S16). Accordingly, the memory device 6 enters the state in which the operation mode change is completed (S17).

Next, the host device 11 checks the state of the memory device 6 to detect that the memory device 6 is in the state in which the change is completed (S18).

Third Embodiment

Figure 5:
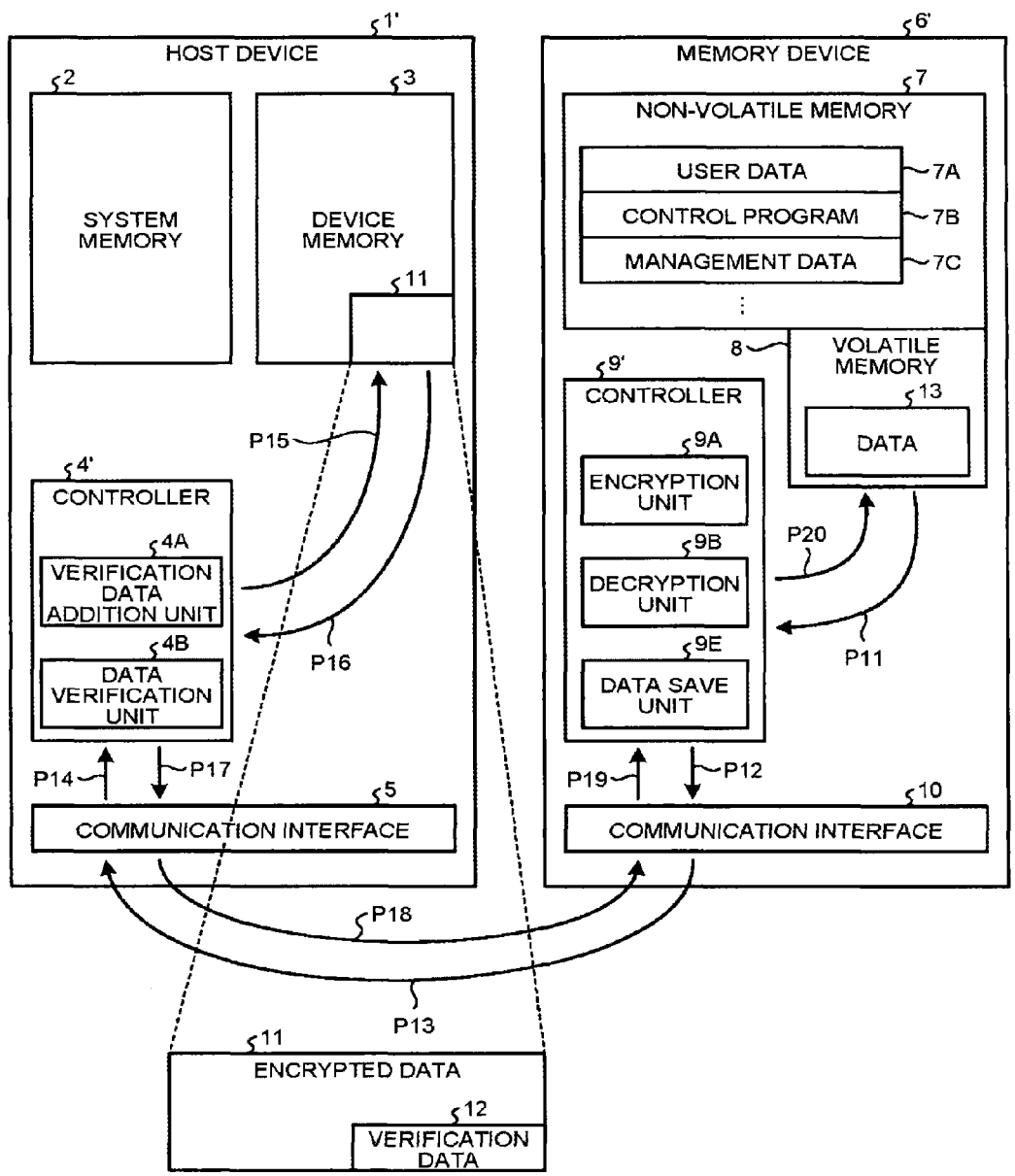
FIG. 5 is a schematic block diagram of a memory system to which a memory device according to a third embodiment is applied.

FIG. 5 is a schematic block diagram of a memory system to which a memory device according to a third embodiment is applied.

Referring to FIG. 5, the memory device includes a host device 1' and a memory device 6' instead of the host device 1 and the memory device 6 illustrated in FIG. 1. The host device 1' includes a controller 4' instead of the controller 4 illustrated in FIG. 1. The memory device 6' includes a controller 9' instead of the controller 9 illustrated in FIG. 1. The controller 4' includes a verification data addition unit 4A and a data verification unit 4B. The verification data addition unit 4A is capable of adding the verification data 12 to the encrypted data 11. The data verification unit 4B is capable of verifying validity or accuracy of the encrypted data 11 based on the verification data 12. The verification data addition unit 4A and the data verification unit 4B can be realized by executing programs describing these operations at a processor. The programs describing these operations can be stored in the host device 1. The controller 9' includes the encryption unit 9A, the decryption unit 9B, and the data save unit 9C.

In addition, when the memory device 6' shifts from the normal operation mode to the low-power consumption mode, the controller 9' generates the encrypted data 11 by encrypting the data 13 on the volatile memory 8 (P11), and transfers the same to the host device 1' via the communication interfaces 5 and 10 (P12 and P13). Then, the controller 4' calculates the verification data 12 from the encrypted data 11, adds the same to the encrypted data 11 (P14), and then stores the same in the device memory 3 (P15).

When the memory device 6' shifts from the low-power consumption mode to the normal operation mode, the encrypted data 11 with the verification data 12 is read from the device memory 3 (P16). Then, the controller 4' verifies the encrypted data 11 with the verification data 12 for validity or accuracy at the controller 4', and then transfers the encrypted data 11 to the memory device 6' via the communication interfaces 5 and 10 (P17 and P18). When the controller 4' has not verified validity or accuracy of the encrypted data 11, the controller 4' may make a notification that validity or accuracy of the encrypted data 11 is not verified to the memory device 6', without transferring the encrypted data 11 to the memory device 6'.

Then, the controller 9' decrypts the encrypted data 11 (P19), and then returns the data 13 to the volatile memory 8 (P20).

Fourth Embodiment

Figure 6:
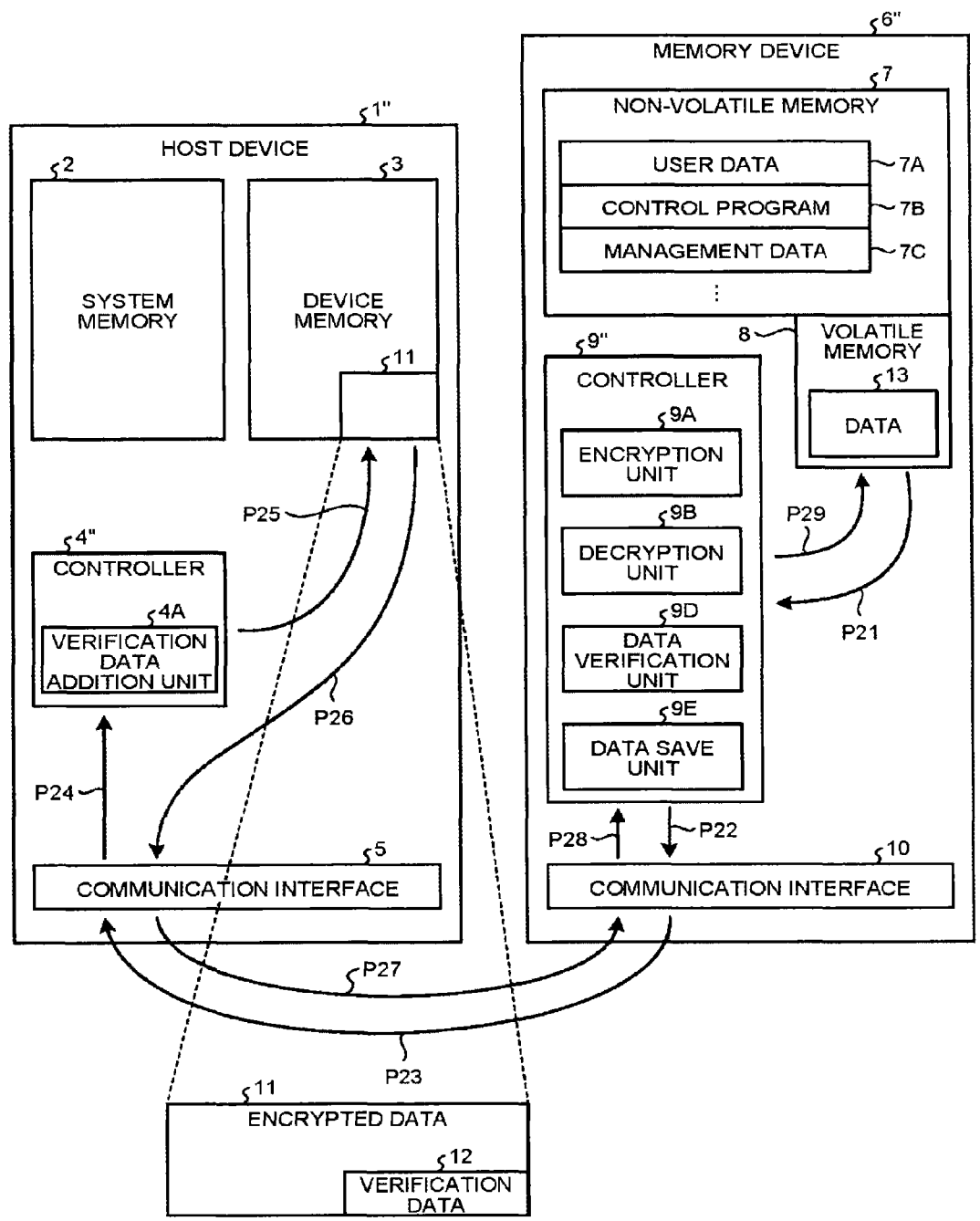
FIG. 6 is a schematic block diagram of a memory system to which a memory device according to a fourth embodiment is applied.

FIG. 6 is a schematic block diagram of a memory system to which a memory device according to a fourth embodiment is applied.

Referring to FIG. 6, the memory device includes a host device 1" and a memory device 6" instead of the host device 1 and the memory device 6 illustrated in FIG. 1. The host device 1" includes a controller 4" instead of the controller 4 illustrated in FIG. 1. The memory device 6" includes a controller 9" instead of the controller 9 illustrated in FIG. 1. The controller 4" includes the verification data addition unit 4A. The controller 9" includes the encryption unit 9A, the decryption unit 9B, the data verification unit 9D, and the data save unit 9E.

In addition, when the memory device 6" shifts from the normal operation mode to the low-power consumption mode, the controller 9" generates the encrypted data 11 by encrypting the data 13 in the volatile memory 8 (P21), and transfers the same to the host device 1" via the communication interfaces 5 and 10 (P22 and P23). Then, the controller 4" calculates the verification data 12 from the encrypted data 11, and added the same to the encrypted data 11 (P24), and then stores the same in the device memory 3 (P25).

When the memory device 6" shifts from the low-power consumption mode to the normal operation mode, the encrypted data 11 with the verification data 12 is read from the device memory 3 (P26), and then is transferred to the memory device 6" via the communication interfaces 5 and 10 (P27 and P28). Then, the controller 9" verifies the encrypted data 11 with the verification data 12 for validity or accuracy, and decrypts the encrypted data 11 (P28), and then returns the data 13 to the volatile memory 8 (P29).

In the fourth embodiment of FIG. 6, the verification data 12 is added at the host device 1" side, and data verification is performed at the memory device 6" side. Alternatively, data verification may be performed at the host device 1" side and the verification data 12 added at the memory device 6" side.

Fifth Embodiment

Figure 7:
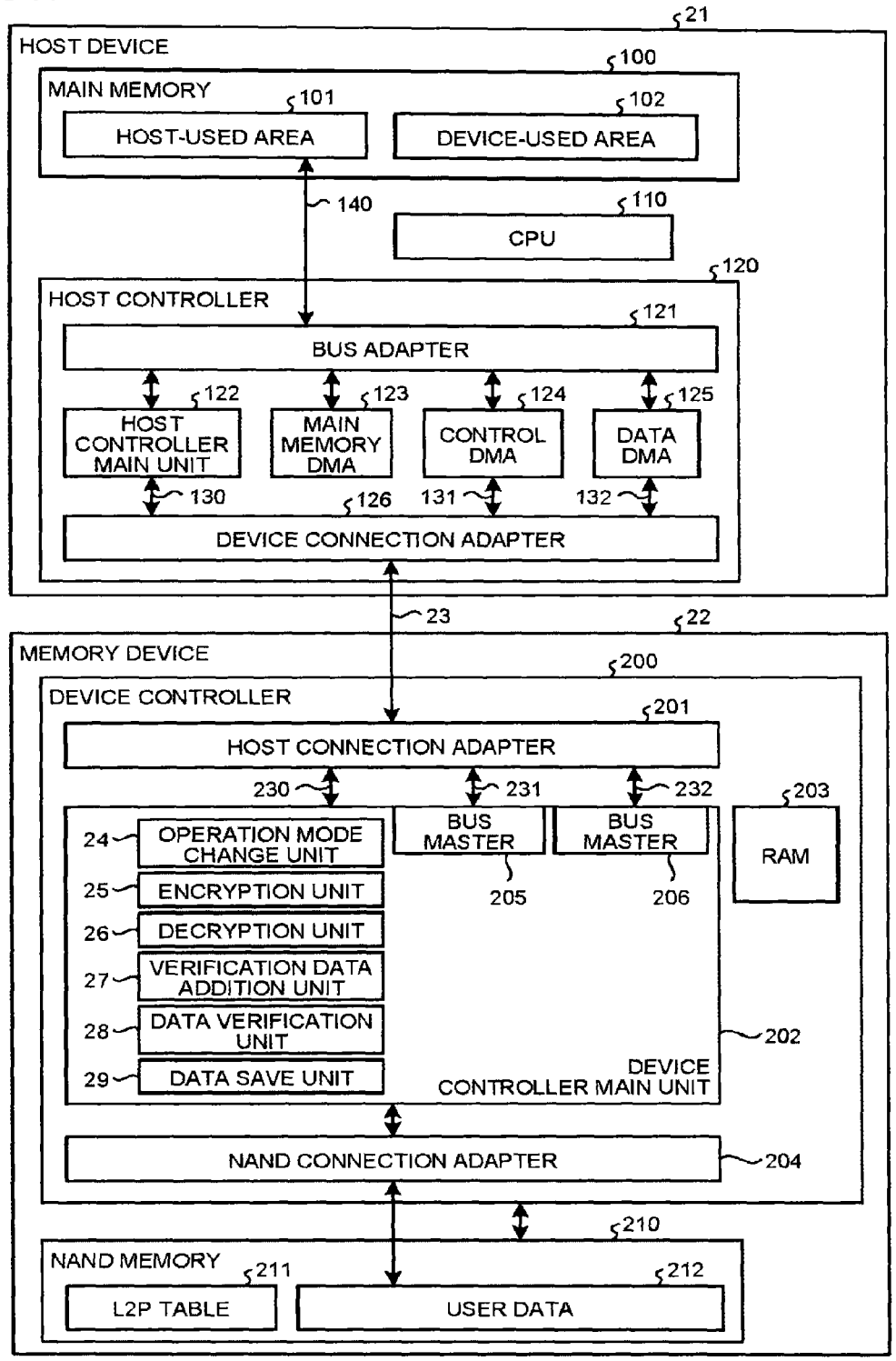
FIG. 7 is a schematic block diagram of a memory system to which a memory device according to a fifth embodiment is applied.

FIG. 7 is a schematic block diagram of a memory system to which a memory device according to a fifth embodiment is applied. In the fifth embodiment, the memory system is a UMA (unified memory architecture), and a main memory 100 included in a host device 21 is shared by the host device 21 and a memory device 22.

Referring to FIG. 7, the memory device 22 supports Unified Memory Extension, and stores data needed to be saved at change of operation modes in the host device 21. The data needed to be saved at change of operation modes may be firmware for use in the memory device 22, for example.

The memory device 22 has operation modes such as normal operation mode, first to N-th (N is a natural number) low-power consumption modes, and power-off mode, for example. The power-off mode is an operation mode in which the entire memory device 22 is powered off. The low-power consumption modes are operation modes in which at least a part of a non-volatile memory (RAM 203) included in the memory device 22 is powered off.

For example, in the memory system, the low-power consumption modes are set such that power consumption of the memory device 22 becomes smaller in order of first to N-th low-power consumption modes. In the memory system, operation modes are changed (state transitions take place) among the normal operation mode, the first to N-th low-power consumption modes, the power-off mode, and the like, according to the operations of the memory system.

In the embodiment, at change of operation modes, when it is necessary to save data in the volatile memory (RAM 203), the data is stored in the host device 21. Then, at another change of operation modes, when the saved data is to be restored (re-loaded) in the volatile memory, the data saved to the host device 21 is stored in the volatile memory. As described above, data to be saved from the volatile memory at change of operation modes is written/read in the host device 21, which shortens a time required for change of operation modes.

The host device 21 and the memory device 22 are connected together by a communication path 23. The memory device 22 may be a built-in flash memory, SSD, or the like in conformance with UFS standards. The memory system may be a personal computer, a cellular phone, an image device, or the like, for example. The communication standards adopted for the communication path 23 are MPHY and Unipro defined in MIPI (mobile industry processor interface), for example.

The memory device 22 includes a device controller 200 that conducts data transfer between an NAND memory 210 and the host device 21.

The NAND memory 210 includes one or more memory chips with a memory cell array. The memory cell array is formed by a matrix of a plurality of memory cells. Each of blocks in the memory cell array is formed by a plurality of pages. Each of the pages is a unit of data reading and writing, for example.

The NAND memory 210 stores a L2P table 211 and user data 212 transmitted from the host device 21. The user data 212 includes, for example, an operating system program (OS) in which the host device 21 provides execution environments, a user program executed on the OS by the host device 21, data input or output by the OS or the user program, and others.

The L2P table 211 is one of information required by the memory device 22 to function as an external memory device with respect to the host device 21. The L2P table 211 includes address conversion information that associates logical block addresses used by the host device 21 to access the memory device 22 with physical addresses in the NAND memory 210.

The device controller 200 includes a host connection adapter 201 as a connection interface for the communication path 23 and an NAND connection adapter 204 as a connection interface with the NAND memory 210. The device controller 200 also includes a device controller main unit 202 that executes control of the device controller 200 and a RAM 203 as a volatile memory device.

The RAM 203 is used as a buffer for storing data to be written into the NAND memory 210 or data read from the NAND memory 210. The RAM 203 is also used as a command queue for queuing commands relating to a write request, a read request, instructions for change of operation modes, and others input from the host device 21. The RAM 203 is also used as a memory for storing firmware and the like for use in operations of the memory device 22. For example, the RAM 203 is formed by an SRAM, a DRAM, or the like. Alternatively, the functions of the RAM 203 may be performed by a register or the like.

The device controller main unit 202 controls data transfer between the host device 21 and the RAM 203 via the host connection adapter 201. The device controller main unit 202 also controls data transfer between the RAM 203 and the NAND memory 210 via the NAND connection adapter 204.

The device controller main unit 202 functions as a bus master in the communication path 23 to the host device 21 to use data transfer using a first port 230, and includes two other bus masters 205 and 206.

The bus master 205 can conduct data exchange with the host device 21 using a second port 231. The bus master 206 can conduct data exchange with the host device 21 using a third port 232.

The device controller main unit 202 is formed by a microcomputer unit including a computation device and a memory device or the like, for example. The device controller main unit 202 executes firmware stored in advance in the memory device on the RAM 203, thereby realizing the function of the device controller main unit 202.

Alternatively, the memory device may be eliminated from the device controller main unit 202 such that the firmware can be stored in the NAND memory 210. In addition, the device controller main unit 202 may be formed using ASIC.

The device controller main unit 202 in the embodiment includes an operation mode change unit 24, an encryption unit 25, a decryption unit 26, a verification data addition unit 27, a data verification unit 28, and a data save unit 29. The operation mode change unit 24 changes operation modes of the memory device 22 and the host device 21. The encryption unit 25 encrypts data saved in the host device 21. The decryption unit 26 decrypts encrypted data obtained by encrypting the data saved in the host device 21. The decryption unit 26 decrypts the encrypted data obtained by encrypting the data saved in the host device 21. The verification data add unit 27 adds verification data for use in verification by the data verification unit 28 to the data saved in the host device 21. The verification data may be a hash and a checksum. The data verification unit 28 verifies validity or accuracy of the data saved in the host device 21, based on the verification data. The data save unit 29 saves the data stored in the memory device 22 to the host device 21.

The memory device 22 according to the embodiment is assumed as a built-in flash memory in conformance with the UFS standards, for example. Thus, commands and others described below are based on the UFS standards, for example.

The host device 21 includes a CPU 110 that executes OS and user programs, a main memory (host-side memory device) 100, and a host controller 120. The main memory 100, the CPU 110, and the host controller 120 are connected together via a bus 140.

The host device 100 is formed by a DRAM, for example. The host device 100 has a host-used area 101 and a device-used area 102. The host-used area 101 is used as a program development area for the host device 21 to execute OS or user programs or a work area for the host device 21 to execute the programs developed in the program development area.

The device-used area 102 is a data memory area allocated to devices other than the host device 21 (memory device 22 and the like). The device-used area 102 is used as a cache area for data saved from the memory device 22 or data to be read and written.

Change of operation modes includes change of operation modes in which data stored in the memory device 22 needs to be saved to the host device 21 and change of operation modes in which data saved to the host device 21 needs to be restored in the memory device 22 (change to the recovery mode).

Specifically, when a process for changing from the operation mode with larger power consumption to the operation mode with smaller power consumption is performed, data to be saved from the memory device 22 is saved to the host device 21.

In addition, when a process for changing from the operation mode with smaller power consumption to the operation mode with larger power consumption is performed, the memory device 22 reads and restores the data saved from the memory device 22, from the host device 21.

Next, ports of the host device 21 and the memory device 22 according to the embodiment will be described. The host device 21 and the memory device 22 according to the embodiment are physically connected together via one communication path 23, and are also connected together by a plurality of access points called ports (also called CPort) described below.

The host controller 120 includes a bus adapter 121 as a connection interface for a bus 140, a device connection adapter 126 as a connection interface for the communication path 23, and a host controller main unit 122.

The host controller main unit 122 exchanges data and commands with the host device 100 or the CPU 110 via the bus adapter 121. The host controller main unit 122 also exchanges data (including commands) with the memory device 22 via the device connection adapter 126.

The host controller main unit 122 is connected to the device connection adapter 126 by a first port 130 to exchange data with the memory device 22 via the first port 130.

The host controller 120 also includes a main memory DMA 123, a control DMA 124, and a data DMA 125. The main memory DMA 123 conducts DMA transfer between the host-used area 101 and the device-used area 102.

The control DMA 124 catches a command sent from the memory device 22 to access the device-used area 102. The control DMA 124 also transmits status information for the host controller main unit 122 in relation to the device-used area 102, to the memory device 22. The control DMA 124 is connected to the device connection adapter 126 by a second port 131 to exchange commands and status information with the memory device 22 via the data 131.

The data DMA 125 conducts DMA transfer between the device-used area 102 and the memory device 22. The data DMA 125 is connected to the device connection adapter 126 by a third port 132 to exchange data with the memory device 22 via the data 132.

By the functions of the device connection adapter 126 and the host connection adapter 201, the data 130 is associated with the first port 230, the data 131 is associated with the second port 231, and the data 132 is associated with the third port 232, respectively.

Specifically, the device connection adapter 126 transmits the contents of the data sent to the memory device 22 via the first port 130, to the device controller main unit 202 via the first port 230. The device connection adapter 126 also transmits the contents of the data sent to the memory device 22 via the second port 131, to the device controller main unit 202 via the second port 231. The device connection adapter 126 also transmits the contents of the data sent to the memory device 22 via the third port 132, to the device controller main unit 202 via the third port 232.

The device connection adapter 126 also transmits the contents of the data sent to the host device 21 via the first port 230, to the host controller main unit 122 via the first port 130. The device connection adapter 126 also transmits the contents of the data sent to the host device 21 via the second port 231, to the control DMA 124 via the second port 131. The device connection adapter 126 also transmits the contents of the data sent to the host device 21 via the third port 232, to the data DMA 125 via the third port 132. The contents of the data sent to the control DMA 124 or the data DMA 125 are transmitted to the host controller main unit 122 via the bus adapter 121, for example.

Each of the ports 130 to 132 may independently include an input/output buffer for use in communications with the memory device 22. The host controller main unit 122, the control DMA 124, and the data DMA 125 are connected to the memory device 22 using the separate input/output buffers. According to the foregoing configuration, the host controller 120 is capable of executing independently communications with the memory device 22 using the host controller main unit 122, communications with the memory device 22 using the control DMA 124, and communications with the memory device 22 using the data DMA 125. The host controller 120 is also capable of switching among these communications without having to replace the input/output buffers, thereby realizing high-speed communication switching. Similarly, as for the ports 230 to 232 included in the memory device 22, the device controller 200 realizes high-speed communication switching.

As described above, the memory system includes three kinds of ports: first ports (also called CPort 0) 130 and 230, second ports (also called CPort 1) 131 and 231, and third ports (also called CPort 2) 132 and 232.

The first ports 130 and 230 are basically used only when the host device 21 makes a request to the memory device 22. The second ports 131 and 231 and the third ports 132 and 232 are used for the memory device 22 to transmit saved data to the host device 21.

Next, descriptions will be given as to operation examples of the memory system in the case where the memory device 22 saves data to the host device 21.

The device controller main unit 202 of the memory device 22 generates a command (Access UM Buffer) for writing data to be saved into the device-used area 102. The Access UM Buffer includes "write command, address at which the data to be saved is written, and size of the data to be saved" (WRITE, Address, and Size) and the like, and information on ports for use in transmission of the data to be saved. Here, the device controller main unit 202 encrypts the data to be saved and adds the verification data to the data to be saved.

Next, the device controller main unit 202 transmits the data to be saved (UM DATA IN) to the host controller 120. Upon receipt of the command for data writing (Access UM Buffer) from the memory device 22, the host controller 120 receives the write data (UM DATA IN) from the memory device 22, based on the information on WRITE, Address, Size, and the like.

As described above, in the memory system, the memory device 22 spontaneously transfers the Access UM Buffer and the UM DATA IN (data to be saved) to the host device 21 without receiving a request command queue of data to be saved from the host device 21. Accordingly, the memory system allows transmission of the data to be saved from the memory device 22 regardless of a command at the host device 21 side.

Next, the host controller 120 stores the write data (data to be saved) received from the memory device 22 in the device-used area 102.

Next, when the data to be saved is stored in the device-used area 102, the host controller 120 transmits to the memory device 22 an acknowledge command (Acknowledge UM Buffer) indicating completion of the data writing. Accordingly, the memory device 22 completes the writing of data into the host device 21.

The Access UM Buffer and the UM DATA IN may be provided with information for identification of data to be saved. In this case, the host device 21 differentiates between the user data transmitted from the memory device 22 and the data to be saved based on the identification information added to the Access UM Buffer and the UM DATA IN, and stores the same in the host device 100.

Next, descriptions will be given as to operation examples of the memory system in the case where the memory device 22 reads data from the host device 21.

The device controller main unit 202 generates a command for reading saved data from the device-used area 102 (Access UM Buffer).

The Access UM Buffer includes "read command, address at which saved data is read, and size of saved data" (READ, Address, and Size) and the like, and information on ports for use in reading of saved data and the like.

Next, upon receipt of the command for reading data (Access UM Buffer) from the memory device 22, the host controller 120 fetches read data (saved data) from the device-used area 102 based on the information such as (READ, Address, and Size) and the like.

Next, the host controller 120 transfers the fetched saved data to the memory device 22 (UM DATA OUT). The memory device 22 decrypts the encrypted saved data and verifies validity or accuracy of the saved data, based on the verification data added to the saved data. Then, the memory device 22 stores the data saved to the host controller 120 in the RAM 203, thereby restoring the saved data on the RAM 203.

In the example of FIG. 7 described above, addition of the verification data and verification of the data are performed at the memory device 22 side. Alternatively, addition of the verification data and verification of the data may be performed at the host device 21 side. Alternatively, addition of the verification data may be performed at the host device 21 side and verification of the data may be performed at the memory device 22 side. Alternatively, verification of the data may be performed at the host device 21 side and addition of the verification data may be performed at the memory device 22 side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
   a non-volatile memory;
   a volatile memory that stores data read from the non-volatile memory; and
   a controller that controls operations of the memory device; wherein,
   the controller saves to a host device the data stored in the volatile memory without a saving request from the host device;
   the controller reads the data from the host device after the data is saved to the host device; and
   the controller verifies validity or accuracy of the data read from the host device based on verification data added to the data saved in the host device,
   wherein the verification data is a checksum or a hash; and
   wherein, when there is no match between a checksum or a hash determined from the data saved in the host device and a checksum or a hash added to the data saved in the host device, the controller accesses the non-volatile memory to recover the data saved in the host device.

2. The memory device according to claim 1, wherein,
   the controller adds the verification data to the data stored in the volatile memory before the data is saved to the host device.

3. The memory device according to claim 2, wherein,
   the controller encrypts the data in the volatile memory before the data is saved to the host device; and
   the controller decrypts the encrypted data read from the host device after saved to the host device.

4. The memory device according to claim 1, wherein, when a shift takes place from a normal operation mode to a low-power consumption mode, the controller saves to the host device the data stored in the volatile memory without a saving request from the host device.

5. The memory device according to claim 4, wherein, when a shift takes place from the low-power consumption mode to the normal operation mode, the controller reads the data from the host device.

6. A data storing method, comprising:
   saving data stored in a memory device to a host device without a saving request from the host device;
   reading the data from the host device after saving the data to the host device;
   verifying validity or accuracy of the data read from the host device based on verification data added to the data saved in the host device; and
   accessing the memory device to recover the data saved in the host device when there is no match between a checksum or a hash determined from the data saved in the host device and a checksum or a hash added to the data saved in the host device,
   wherein the verification data is a checksum or a hash.

7. The data storing method according to claim 6, wherein the verification is performed at the memory device side.

8. The data storing method according to claim 6, wherein the verification is performed at the host device side.

9. The data storing method according to claim 6, wherein verification data for use in the verification is added to the data saved to the host device before the data is saved to the host device.

10. The data storing method according to claim 9, wherein the addition is performed at the memory device side.

11. The data storing method according to claim 9, wherein the addition is performed at the host device side.

12. The data storing method according to claim 9, further comprising:
    encrypting the data in the memory device before saving the data to the host device; and
    decrypting the encrypted data read from the host device after the encrypted data is saved to the host device.

13. The data storing method according to claim 9, wherein, when a shift takes place from a normal operation mode to a low-power consumption mode, the data stored in the memory device is saved to the host device.

14. The data storing method according to claim 13, wherein, when a shift takes place from the low-power consumption mode to the normal operation mode, the data saved in the host device is returned to the memory device.

15. The data storing method according to claim 9, wherein the checksum or the hash is calculated from the data saved to the host device before encryption.

16. The data storing method according to claim 9, wherein the checksum or the hash is calculated from the data saved to the host device after encryption.

* * * * *